(12) United States Patent
Feast et al.

(10) Patent No.: US 6,677,418 B1
(45) Date of Patent: Jan. 13, 2004

(54) PROCESS FOR POLYMERIZATION OF CYCLOOLEFINS AND POLYMERIZABLE CYCLOOLEFINS (75) Inventors: William James Feast, Durham (GB); Ezat Khosravi, Durham (GB); Thanawadee Leejarkpai, Bangkok (TH)

(73) Assignee: University of Durham, Durham (GB)

( * ) Notice: Subject to any disclaimer, the term of this patent is extended or adjusted under 35 U.S.C. 154(b) by 0 days.

(21) Appl. No.: 10/019,315

(22) PCT Filed: Jul. 10, 2000

(86) PCT No.: PCT/GB00/02548
§ 371 (c)(1),
(2), (4) Date: Jan. 9, 2002

(87) PCT Pub. No.: WO01/04173
PCT Pub. Date: Jan. 18, 2001

(30) Foreign Application Priority Data

Jul. 9, 1999 (GB) .............................................. 9916235

(51) Int. Cl.⁷ ............................................... C08F 10/00
(52) U.S. Cl. ........................ 526/281; 526/171; 526/226; 526/237; 526/259; 526/262; 526/280; 526/282; 526/284
(58) Field of Search ................................ 526/171, 226, 526/237, 259, 262, 280, 281, 282, 284

(56) References Cited

U.S. PATENT DOCUMENTS

| | | | | |
|---|---|---|---|---|
| 3,658,669 A | * | 4/1972 | Colomb, Jr. et al. | 204/159.12 |
| 4,354,012 A | * | 10/1982 | Scola | 526/259 |
| 5,219,966 A | * | 6/1993 | Asrar | 526/262 |

FOREIGN PATENT DOCUMENTS

| | | | |
|---|---|---|---|
| EP | 0283719 | | 9/1988 |
| EP | 0 283 719 | * | 9/1988 |
| EP | 0286839 | | 10/1988 |
| EP | 0 286 839 | * | 10/1988 |
| EP | 0297078 | | 12/1988 |
| FR | 1594934 | | 6/1970 |
| FR | 1.594.934 | * | 7/1970 |
| WO | 9616008 | | 4/1996 |
| WO | 9620235 | | 7/1996 |
| WO | 9738036 | | 10/1997 |

* cited by examiner

Primary Examiner—Helen L. Pezzuto
(74) Attorney, Agent, or Firm—Jacobson Holman PLLC (57) ABSTRACT

Process for the catalytic copolymerisation (ROMP) of strained activated cyclic olefins comprising contacting an activated strained mono (poly)cyclic olefin monomer of formula

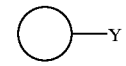

with at least 1 wt % of an activated strained di (poly)cyclic olefin monomer of formula

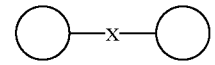

in the presence of a catalyst or an initiating agent wherein the group

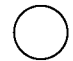

represents a strained (poly)cyclic olefin, tail Y and spacer X comprise preferably electron withdrawing and property modulating groups
whereby the monomers form a copolymer comprising the repeating unit

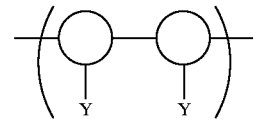

and at least 1 wt % of the unit

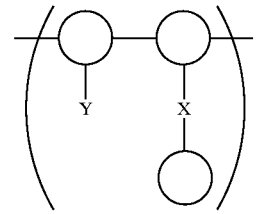

which is adapted for subsequent cross linking of respective copolymer chains in the presence of heat and catalyst to form an amount of a cross linked copolymer comprising the unit,

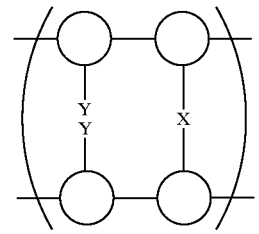

and polymeric products obtained thereby, novel monomers and intermediates, a method for selecting monomers for reaction a method for the preparation of shaped products by RIM or RTM, and shaped products obtained thereby.

12 Claims, 8 Drawing Sheets

FIG. 1

FIG. 2

Example 1

2-Ethylhexyl Acrylate     CPD

Toluene Reflux

Norbornene Ethylhexyl Carboxylate

FIG. 3

Example 1

FIG. 4

Example 1

FIG. 5

Example 2

FIG. 6

Example 3

FIG. 7

Example 4

FIG. 8

Monomer systems

Norbornene isobornyl carboxylate

Norbornene phenyl carboxylate

Norbornene ethylhexyl carboxylate

Norbornene phenoxyethyl carboxylate n=2,3,4,5,7

Alkyl norbornene dicarboxyimides

Figure 9:
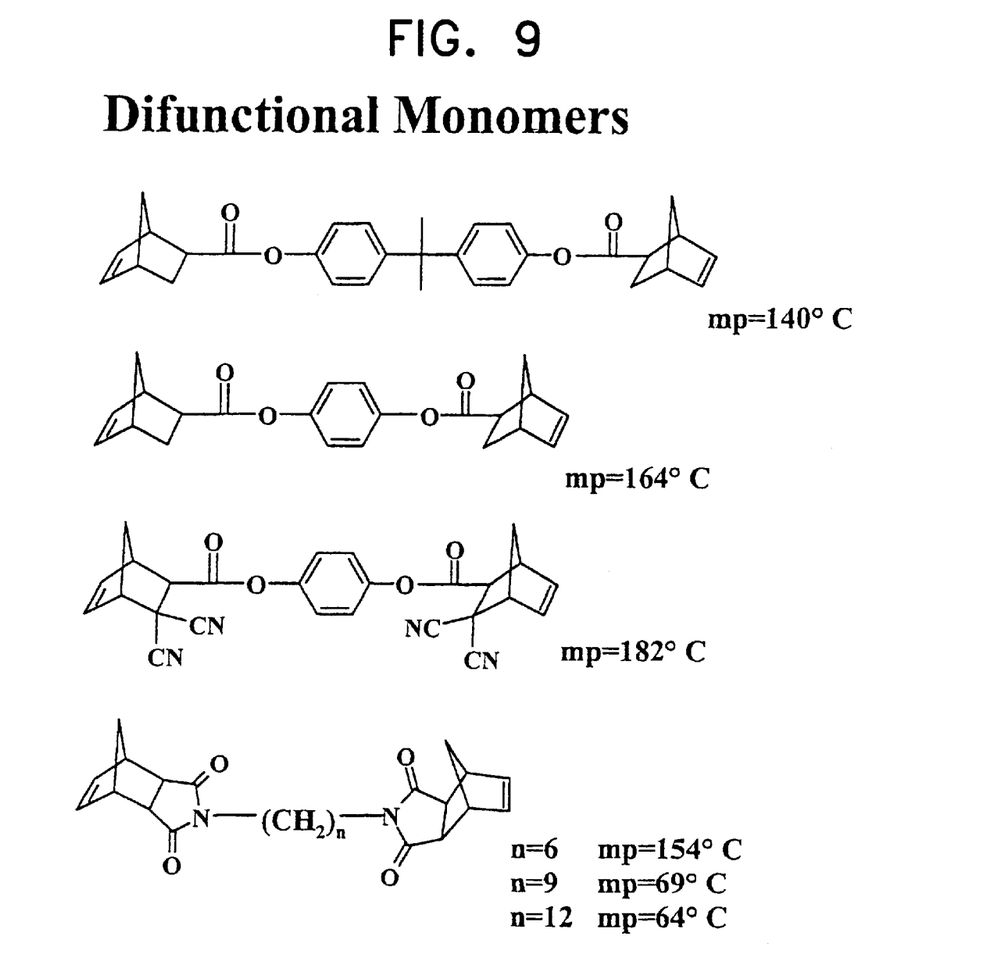

FIG. 9
Difunctional Monomers mp=140° C mp=164° C mp=182° C n=6   mp=154° C
n=9   mp=69° C
n=12  mp=64° C

FIG. 10

Example 7

Norbornene Isobornyl Carboxylate

FIG. 11

Dynamic mechanical thermal analysis results for samples prepared from C5M + 1%, 2.5%, 10% C12D by the method of Example 8

PROCESS FOR POLYMERIZATION OF CYCLOOLEFINS AND POLYMERIZABLE CYCLOOLEFINS

This is a nationalization of PCT/GB00/02548 filed Jul. 10, 2000 and published in English.

The present invention relates to a process for the polymerisation of olefins, novel polymerisable olefins, curable compositions thereof, the products thereof and their use in the preparation of shaped products, coatings and the like. More particularly the invention relates to a process for the copolymerisation of monofunctional and bifunctional strained bicyclic olefin monomers, novel monofunctional and bifunctional strained bicyclic olefin monomers, and their associated compositions, products and uses.

The polymerisation of dicyclopentadiene (DCPD) has long been known and commercially operated for the production of shaped thermoset cross linked products which are extremely hard. The products are particularly useful since they undergo surface oxidation allowing them to be painted, and rendering them odorless. The catalysts employed are air sensitive and functional group sensitive, complicating the process, and limiting the reaction in terms of monomer variation.

Polymerisation of derivatives is known from the literature. In particular a number of publications (Ciba Geigy) relate to novel ("Grubbs") catalysts for use in polymerising strained olefins and their derivatives. The catalysts are disclosed as suited for the polymerisation of a vast range of polymerisable monofunctional monomers and difunctional bridged monomers, by virtue of their excellent moisture tolerance. However polymerisation of only a limited number of the disclosed monomer and dimer classes is described. WO 97/38036 describes ring opening metathesis polymerisation of an at least 3 membered alicyclic cycloolefin with a specific ruthenium catalyst. Cycloolefin ring substituents are inert and do not adversely affect the chemical and thermal stability of the catalyst. WO 96/20235 describes the corresponding polymerisation of dicyclopentadiene (DCPD) optionally with an at least 3 membered alicyclic cycloolefin. WO 96/16008 describes the corresponding polymerisation of a bridged cycloolefin as a dimer, trimer or the like.

We have now surprisingly found that by selection of particular classes of novel and known polymerisable monofunctional monomers and difunctional bridged monomers and combinations thereof, and polymerising with a class of transition metal catalyst, a novel type of product may be obtained which exhibits excellent properties in terms of controlling cross-linking density, and associated product modulus and glass transition temperature (Tg), allowing novel uses as elastomers, plastics and composites. Particularly advantageous performance is obtained with use of the known "Grubbs" catalysts.

In its broadest aspect the present invention provides a process for the catalytic copolymerisation of strained (poly) cyclic olefins substituted by at least one carbon skeletal group, wherein the olefins comprise a monofunctional monomer and a difunctional monomer.

Accordingly there is provided according to the present invention a process for the catalytic copolymerisation of strained activated cyclic olefins comprising contacting a strained mono (poly)cyclic olefin monomer of formula with at least 1 wt % of a strained di (poly)cyclic olefin monomer of formula in the presence of a catalyst or an initiating agent wherein the group represents a strained (poly)cyclic olefin, tail Y and spacer X comprise preferably electron withdrawing and property modulating groups
whereby the monomers form a copolymer comprising the repeating unit and at least 1 wt % of the unit which is adapted for subsequent cross linking of respective copolymer chains in the presence of heat and catalyst to form an amount of a cross linked copolymer comprising the unit, wherein groups are as hereinbefore defined.

The process of the invention provides for preparation of polymeric materials having tailored properties, whereby monofunctional monomer tail Y and difunctional monomer spacer X may be selected to have desired properties in terms of stiffness or flexibility, mobility or immobility, in terms of tail or spacer length, spatial orientation, and may be combined in any given ratio of monomers and the like.

Without being limited to this theory it is thought that the strained (poly)cyclic olefins of the invention may in fact be substituted by any nature of substituent which allows variation in "softness" and "hardness" or the like and regulation of crosslinking of polymeric material. The most convenient form allowing gradation of properties is that of a carbon skeleton which may be varied in length. The substituent according to the invention is also normally linked to the olefin by an electron withdrawing group, for reasons of ease of synthesis and the like. Other linking groups may be envisaged such as simple hydrocarbon, phenyl, or alkoxyl (electron donating), whereby the process of the invention may however be carried out with use of any combination of mono and difunctional monomer as hereinafter defined Reference herein to a monofunctional monomer, hereinafter CnM, and a difunctional monomer, hereinafter CmD, is to compounds comprising respectively one and two strained (poly)cyclic olefin functional units.

The cyclic olefin is preferably a monocyclic olefin, more preferably norbornene, substituted in the 5 and/or 6 positions by exo- and/or endo-normally electron withdrawing group(s) and property modulating tail Y and spacer X as hereinbefore defined.

Preferably an electron withdrawing group is a carbonyl group.

Preferably the monofunctional and difunctional monomer are of formulae I and II:

wherein at least one $R^1$ is a group Y and comprises a preferably electron withdrawing group, facilitating ROMP reaction with monomer II, and X comprises a 2, 3 or 4-valent or two 2-valent optionally substituted hydrocarbon spacer group(s) adapted to bridge adjacent crosslinked chains and which provides for controllable uniformity and degree of cross linking, providing controlled modulus and Tg.

Preferably at least one $R^1$ is independently selected from $COOR^2$, $CONR^2$, $COR^2$ and the like
  in which $R^2$ is selected from straight chain and branched, saturated and unsaturated $C_{1-12}$ hydrocarbon optionally substituted by one or more hydroxy, halo, aryl, cyclo $C_{1-8}$ alkyl, bisphenol such as bisphenol A, bisphenol F, phenol, hydroquinone and the like, and optionally including at least one heteroatom such as O, P;
  and one or more of the remaining groups $R^1$ may be selected from H, $C_{1-3}$ alkyl, halo such as F and the like; or two groups $R^1$ together form a cyclic amide or anhydride —$(CH_2)_p$ $CONR^3CO$—; —$(CH_2)_p$ COOCO—
  in which p is 0–4, and is 0 when the two groups form a fused structure or 1–4 when the two groups form a spiro structure;
  $R^3$ is as hereinbefore defined for $R^2$ and is a bridging unit; and
  X is a linear or fused bridging moiety as hereinbefore defined.

Preferably X is a linear bridging group —$COOR^2COO$— wherein $R^2$ is as hereinbefore defined, substituting the cyclic olefin at the 5 positions and the 6 positions are unsubstituted or substituted by H, $C_{1-3}$ alkyl, halo such as F and the like; or X is a fused bridging group —$(CO)_2NR^3N(CO)_2$— in which —$(CO)_2$ N forms a 5 membered cyclic ring with the 5 and 6 positions of each cyclic olefin, and wherein $R^3$ is as hereinbefore defined.

Monomers may be exo-, endo- or a mixture thereof. The process of the invention allows the option to select isomers for desired Tg (endo is stiffer than exo) and % trans isomer in the product. Preferably monomers are exo-, which are generally more reactive, than endo- although resulting in lower product Tg.

Preferably the process comprises dissolving the difunctional monomer in the monofunctional monomer and adding initiator in monomer solution. The process conditions may be controlled by selection of monomer ratio and isomer type to provide well ordered living polymerisation or otherwise. It is a particular advantage that the process provides substantially complete cure.

Figure 1:
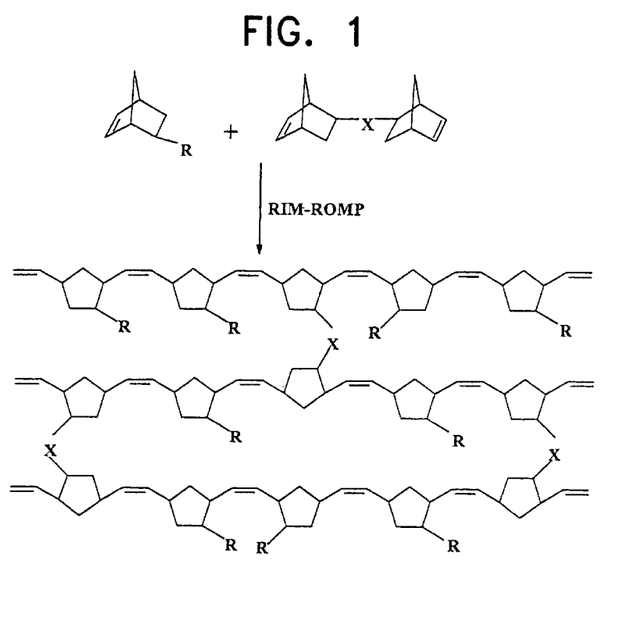

The process of the invention provides as polymeric product of the reaction of I and II a crosslinked structure, an example of which is illustrated in FIG. 1, in which the nature (length) of R leads to control of properties within the system from soft thermoset elastomers to hard or rigid thermoset materials.

The polymerisation is suitably carried out in a predetermined ratio of I:II determining cross-link density and Tg. The selection of groups $R^2$, $R^3$ and X as appropriate determines the material as hard or soft and its modulus and Tg.

A preferred ratio of monomer to difunctional monomer I:II is in the range 99:1 to 50:50, preferably 95:5 to 70:30 or 99:1 to 90:10, which may conveniently be expressed as CnM+x% CmD. More preferably x is 1, 2, 2.5, 3, 5, 8, 10, 30 etc, and is preferably 1 for homogeneous cure.

Contacting the monomer of formula II as hereinbefore defined is preferably in the presence of a catalyst comprising the reaction product of a metal oxide or halide and an alkylating agent. Preferred metals are selected from metals of Group VIII of the Periodic Table of the Elements Mo, Ru, Os, Ir, Rh and Re. Preferred is the "Grubbs" catalyst. The catalyst may be as described in WO 97/38036, WO 96/20235 or WO 96/16008 as hereinbefore referred, the contents of which are incorporated herein by reference.

In some instances it is however possible to use the commercially known air sensitive catalyst comprising a Molybdate initiator (BFGoodrich) and still obtain the advantages of the novel polymerisation process and products.

Traditional ring opening metathesis catalysts comprising a metal oxide MXn and cocatalyst such as $R_3Al$ or $EtAlCl_2$ in combination, optionally with an O-containing promoter such as EtOH or PhOH may also be employed, depending on selection of cyclic olefin substituent.

The catalyst may be in the presence of or include additional catalytic components or catalytic supports. Reaction may be in a suitable inert atmosphere according to choice of catalyst. The catalyst is present in catalytically effective amount, for example in an amount of 10,000:1 eg 4,000:1 monomer:catalyst.

The polymerisation reaction is suitably carried out in substantial absence of any added solvents, the components being mutually compatible. The reaction is carried out at elevated temperature preferably in excess of room temperature up to approximately 200° C. preferably in the range of 60° C.–140° C. or 160° C.–200° C., depending on preferred Tg, eg 90° C.–100° C. to give homogeneous cure. Curing is carried out for a suitable period for example approximately 1 hour. Degassing of monomers is preferably carried out prior to reaction, which may be carried out without need for atmosphere control, or may be carried out in an inert atmosphere, depending on choice of catalyst.

The process of the invention is preferably suited for the preparation of elastomers, plastics, composites in any desired form as shaped products, films, coatings and the like. It is a particular advantage of the process of the invention that such compounds may be readily prepared in which polymerisable monofunctional monomers and/or difunctional bridged monomers are selected to allow controlled crosslinking. The process therefore provides a known and a novel route to access whole ranges of new products using known and novel polymerisable monofunctional monomers and/or difunctional bridged monomers.

In a further aspect of the invention there is provided a class of novel monofunctional monomers of the formula Ii as hereinbefore defined for formula I except that when two $R^1$ together form a cyclic amide, $R^3$ is alkyl having 3 or more carbon atoms, but is not phenyl.

In a further aspect of the invention there is provided a class of novel difunctional bridged monomers of the formula IIi as hereinbefore defined for formula II.

Compounds of the formula I, Ii, II and IIi as hereinbefore defined may be obtained commercially or prepared by known means using Diels Alder methodology.

Copolymers may be exo- or endo- or mixtures thereof and are preferably substantially all exo- as hereinbefore described.

Using this methodology compounds of formula I are obtained from reaction of CPD or a precursor thereof (DCPD may be used and cracks in situ at elevated temperature to yield CPD) with a compound of formula IV:

or of DCPD with a compound of formula V or VI to yield the fused cyclic or spiro dianhydride (VII) and conversion with $R^3NH_2$ to 5,5' or 5,6 cyclo substituted products of formula I

Intermediate compounds of formula IV as hereinbefore defined may be obtained commercially or by known methodology.

Compounds of formula II may be obtained by analogy with the corresponding compound of formula I by reaction of CPD with a compound of formula VIII to yield the linear bridged monomer or reaction of the fused dicarboxyanhydride VII above with diamine $H_2N(CH_2)_{0-12}NH_2$ to yield the fused bridged dicarboxyimide monomer.

Compounds of formula I as hereinbefore defined comprising a poly (1 to 10) cyclic olefin are obtained by interconversion from the corresponding compound of formula I comprising a monocyclic olefin by Diels Alder reaction with CPD In a further aspect of the invention there is provided a process for the polymerisation of polymerisable monofunctional monomers of formula (Ii) as hereinbefore defined.

In a further aspect of the invention there is provided a method for selecting a mono and difunctional monomer as hereinbefore defined, comprising determining modulus and chemical properties of desired cross-links, selecting a ratio of mono:di functional monomers determining the degree of cross-linking, for the cross-linking copolymerisation reaction thereof to provide product with desired properties. The present invention provides choice of multiplicity and nature of polymerisable components to control properties of product in the range of thermoplast (polymerisation of Ii or of IIi) through thermoset (copolymerisation of I and II). Selection of substituents and control of monomer molecular weight allow control of malodourous volatiles during the process and from the polymerised product.

In a further aspect of the invention there is provided a method for the preparation of shaped products comprising reaction injection molding (RIM) or resin transfer molding (RTM) using known techniques.

It is a particular advantage of the present invention that RTM may be employed, by virtue of the lowered reactivity and slower rate of reaction of the polymerisation process of the present invention, by virtue of the presence of the functionalised cyclic olefin groups.

Accordingly the method comprises combining separate streams of polymerisable monofunctional monomers and/or difunctional bridged monomers and catalyst (RIM) or premixing (RTM), injecting into a suitable mold and simultaneously or subsequently heating to activate and/or complete the polymerisation reaction.

The method may employ any suitable reinforcement fibres and the like as known in the art. In this case the mold suitably contains the fibres preformed with use of a binder according to known techniques.

In a further aspect of the invention there is provided a shaped product obtained by the method.

Preferably the shaped product is suitable for any of the hereinbefore defined uses and is associated with advantages in terms of properties (modulus, Tg) as hereinbefore defined.

In a further aspect of the invention there is provided a thermoset or thermoplast polymeric product obtained by a method as hereinbefore defined.

The invention is now illustrated in non limiting manner with reference to the following examples.

EXAMPLE 1

Synthesis of Monofunctional Monomers

Figure 2:
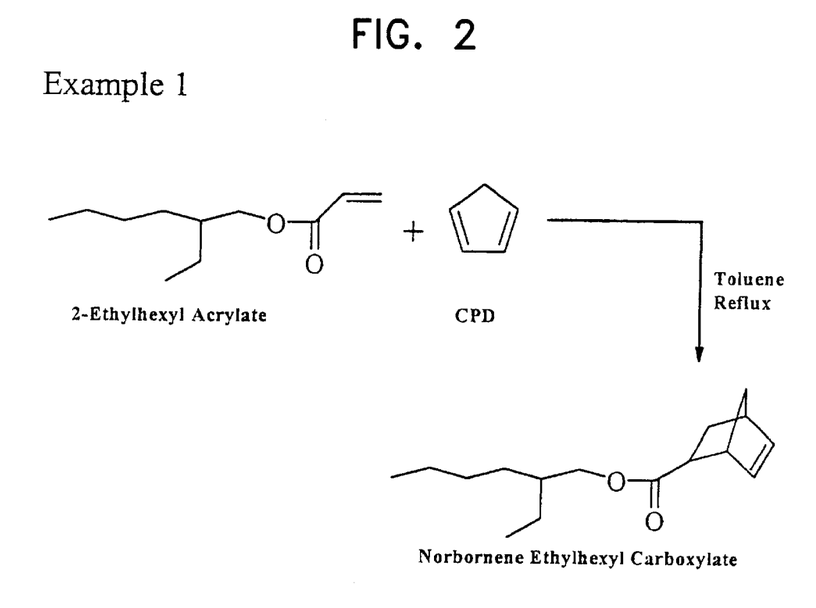
Figure 3:
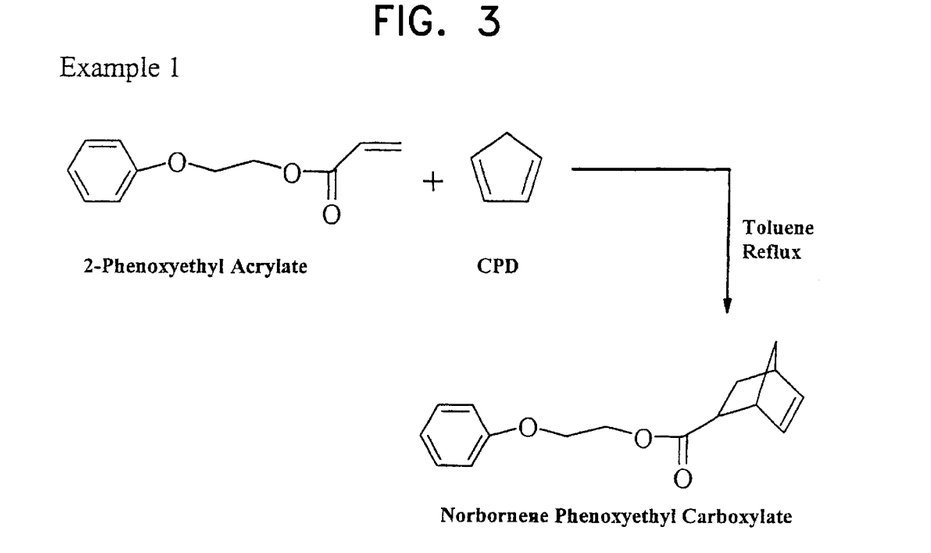
Figure 4:
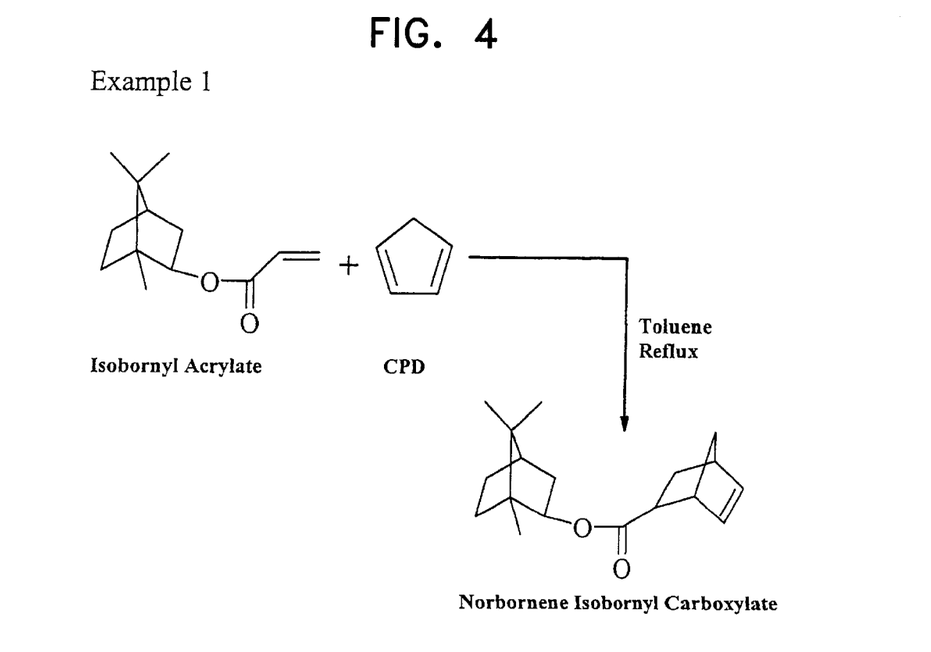

The corresponding acrylate (1 mol) was dissolved in toluene and freshly prepared CPD (1.2 mol) was added slowly at room temperature under nitrogen. The reaction mixture was then refluxed for 12 hours. The monomer was recovered by removing volatiles under reduced pressure. The structure of the monomer was confirmed by $^1H$ and $^{13}C$ nmr. The monomers are as shown in FIGS. 2, 3 and 4.

EXAMPLE 2

Synthesis of Difunctional Monomers

Figure 5:
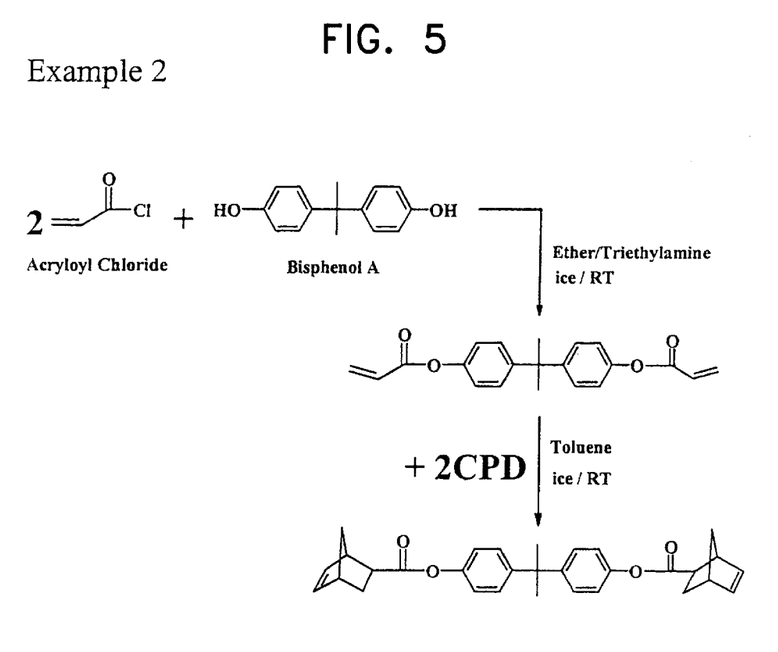

1. Bisphenol A diacrylyl ester: In a flange flask equipped with a high power overhead mechanical stirrer, water condenser and a dropping funnel, bisphenol A (1 mol) was dissolved in THF followed by the addition of triethylamine (4 mol). The flask was kept at ice temperature and under a slow stream of nitrogen. Acryloyl chloride (2 mol) was added dropwise and the temperature was raised to room temperature. The reaction mixture was then refluxed for 12 hours. The resulting mixture was filtered and volatiles were removed under reduced pressure. The crude product was extracted with hot hexane and white crystalline product was obtained upon cooling the hexane solution. The structure of the monomer was confirmed by $^1H$ and $^{13}C$ nmr and mass spectroscopy and is illustrated in FIG. 5.

2. Bisphenol A dinorbornenyl ester: Bisphenol A diacrylyl ester (1 mol) was dissolved in toluene and freshly prepared CPD (2.2 mol) was added slowly at room temperature under nitrogen. The reaction mixture was then refluxed for 12 hours. The monomer was recovered by removing volatiles under reduced pressure. The structure of the monomer was confirmed by $^1H$ and $^{13}C$ nmr and mass spectroscopy and is shown in FIG. 5.

EXAMPLE 3

Synthesis of Difunctional Monomers

Using the procedure for Bisphenol A diacrylyl ester above, but using hydroquinone (1 mol), Hydroquinone diacrylyl ester was obtained. The structure of the monomer was confirmed by $^1H$ and $^{13}C$ nmr and mass spectroscopy and is shown in FIG. 6.

Figure 6:
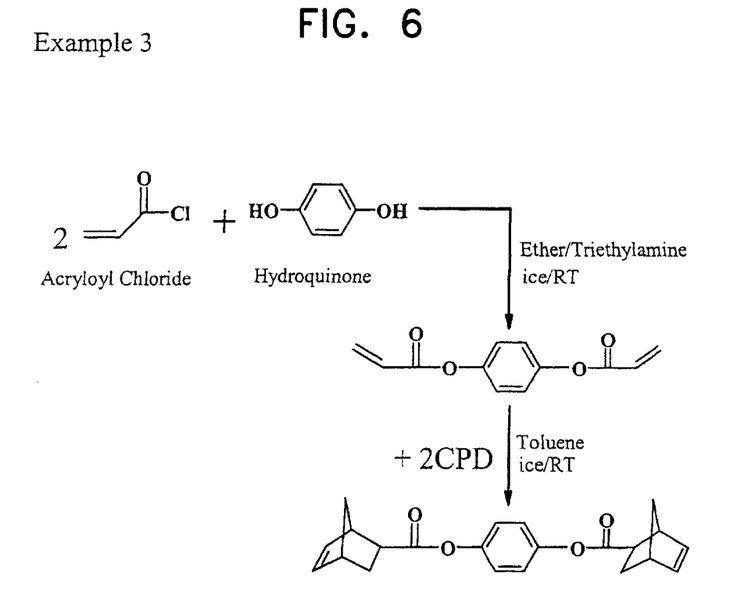

The monomer was converted to the difunctional monomer Hydroquinone dinorbornenyl ester using the above synthesis as shown in FIG. 6.

EXAMPLE 4

Synthesis of monofunctional monomers

Exo- and endo-Norbornene-5,6-dicarboxyanhydride (exo- and endo-M), and Dicarboxyimide (exo-CnM (n=3,4,5,6, 7 and 8) and endo-C6M).

Figure 7:
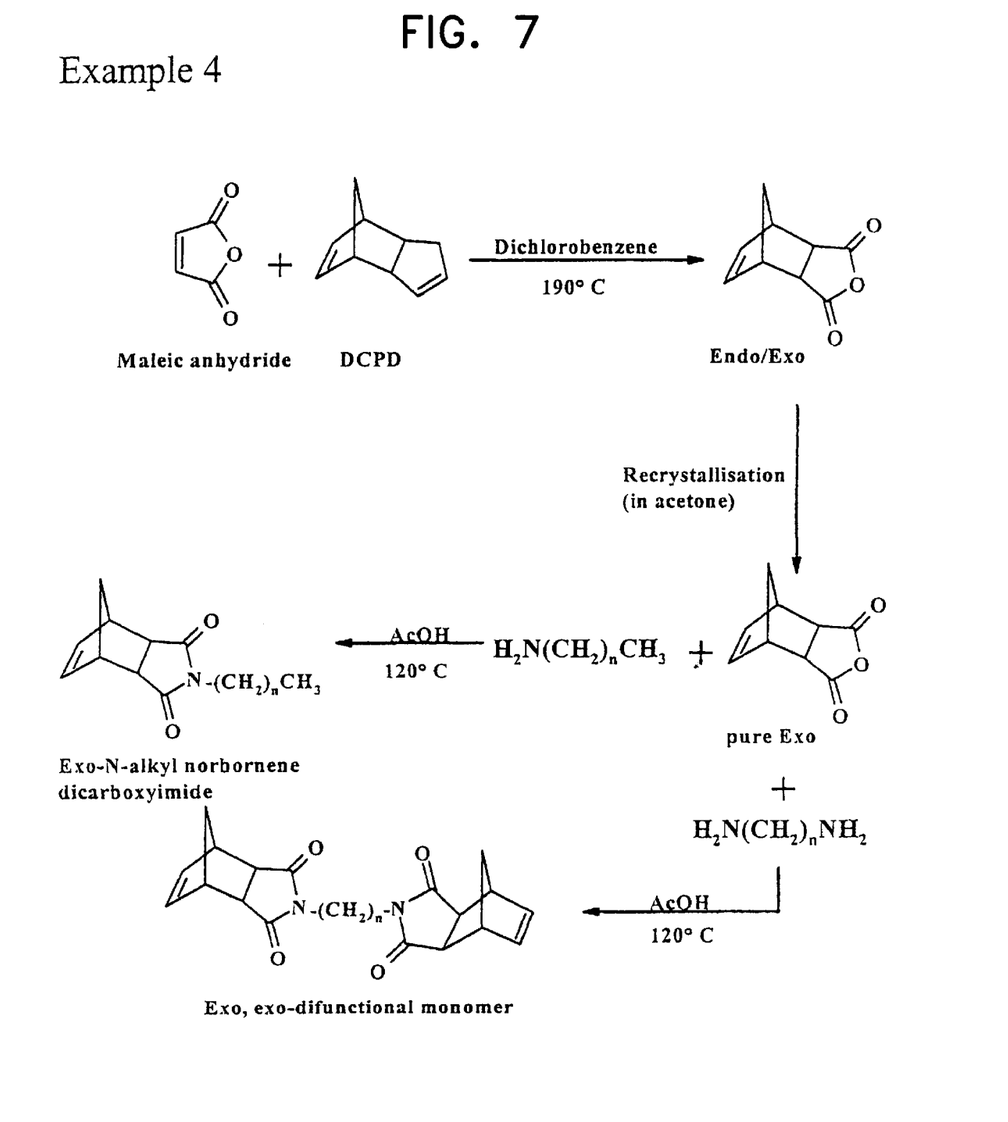

These monomers were synthesised and characterised using procedures as referred and disclosed in *Eur Polym J* Vol 34, No 2 pp 153–157, 1998 and *Polymer* Vol 39, No 23, pp 5619–5625, 1998, Khosravi and Al-Hajaji and are illustrated in FIG. 7.

EXAMPLE 5

Synthesis of Difunctional Monomers

Exo- and endo-Dinorbornene-5,6-dicarboxyimide (exo-CnD, n=3,5,6,9,12).

Starting from the dicarboxyanhydride monomer of Example 4, the synthesis of these difunctional monomers is described as follows and illustrated in FIG. 7.

Synthesis and Characterisation of Difunctional Monomers

General Procedure for the Synthesis of exo,exo-Difunctional Monomers: exo-CnD A known weight of exo-AN was dissolved in glacial acetic acid at 118–120° C. in a round bottom flask equipped with a condenser, a solids addition tube (for solid diamines) or addition funnel (for liquid diamines), a thermometer and a magnetic stirrer bar. The required amount of n-alkyl diamine was added slowly. The reaction mixture was refluxed for 2 hours at 120° C. using a silicone oil bath. The reaction mixture was poured into cold distilled water which was then extracted with dichloromethane. The organic layer was washed twice with distilled water, dried over anhydrous magnesium sulphate, filtered and the solvent was removed under vacuum to give the difunctional monomers as white powders. Analytical samples were obtained by further recrystallisation from acetone.

Synthesis and Characterisation of exo,exo-N,N'-Propylene-di-(norbornene-5,6-dicarboxyimides): (exo-C3D)

exo-AN (20.0 g, 0.12 mol) was dissolved in glacial acetic acid (130 ml) at 118–120° C. in a 3-necked round bottom flask equipped with a condenser, addition funnel, a thermometer and a magnetic stirrer bar. 1,3-Diaminopropane (4.4 g, 5 ml, 0.06 mol) was added to the flask via the dropping funnel over a period of 1 hour. The reaction mixture was heat to reflux for 2 hours, giving a pale yellow solution. The solution was poured into cold distilled water which was then extracted with dichloromethane. The organic layer was washed twice with distilled water, dried over anhydrous magnesium sulphate, filtered and the solvent was removed under vacuum. The final product was obtained by further recrystallisation from acetone to give the white powder, exo-C3D (40.0 g, 0.11 mol, 91% yield).

Mpt: 131.6° C.; Elemental analysis—Found C, 68.78%, H, 5.98%, N, 7.73%; calculated for $C_{21}H_{22}N_2O_4$: C, 68.84%, H, 6.05%, N, 7.64%. $^1H$ nmr—(see Appendix 2.33), ($CDCl_3$, 400 MHz), δ (ppm)): 6.28 (t, 4H, $H_{2,3}$), 3.46 (t, 4H, $H_8$), 3.25 (p, 4H, $H_{1,4}$), 2.66 (d, 4H, $H_{5,6}$), 1.86 (p, 2H, $H_9$), 1.52 (m, 2H, $H_7$), 1.29 (m, 2H, $H_7$). $^{13}C$ nmr—(see Appendix 2.34), ($CDCl_3$, 100 MHz), δ (ppm)): 177.94 ($C_{10,11}$), 137.82 ($C_{2,3}$), 47.84 ($C_{5,6}$), 45.55 ($C_{1,4}$), 43.20 ($C_7$), 36.20 ($C_8$), 26.32 ($C_9$), Mass spectrum—(see Apendix 2.35), ($EI^+$): 366 ($C_{21}H_{22}N_4O_2$, $M^+$), 301 ($MH^+-C_5H_6$), 235 ($MH^+-C_{10}H_{12}$), 66 ($M^+-C_{16}H_{16}N_4O_2$). IR—(see Appendix 2.36), (KBr disc, $cm^{-1}$): 3048 (olefinic C—H stretching), 2996–2881 (saturated C—H stretching), 1859, 1776 (Asymmetric and symmetric C=O stretching, respectively), 1425 (C—N stretching).

Assignment of H atoms in compound exo-C3D

Assignment of C atoms in compound exo-C3D

Synthesis and Characterisation of exo,exo-N,N'-Pentylene-di-(norbornene-5,6-dicarboxyimides): (exo-C5D)

The same procedure as for the synthesis of exo-C3D was used to synthesise exo-C5D, but the starting material in this case was 1,5-diaminopentane (6.1 g, 0.06 mol) to yield exo-C5D as a white powder (42.5 g, 0.11 mol, 90% yield).

Mpt: 185.1° C.; Elemental analysis—Found C, 69.96%, H, 6.56%, N, 7.20%; calculated for $C_{23}H_{26}N_2O_4$: C, 70.03%, H, 6.64%, N, 7.10%. $^1$H nmr—(see Appendix 2.37), (CDCl$_3$, 400 MHz, δ (ppm)): 6.28 (t, 4H, H$_{2,3}$), 3.44 (t, 4H, H$_8$), 3.26 (p, 4H, H$_{1,4}$), 2.67 (d, 4H, H$_{5,6}$), 1.57 (m, 4H, H$_9$), 1.51 (m, 2H, H$_7$), 1.21 (m, 2H, H$_7$), 1.31 (p, 2H, H$_{10}$). $^{13}$C nmr—(see Appendix 2.38), (CDCl$_3$, 100 MHz, δ (ppm)): 178.05 (C$_{11,12}$), 137.80 (C$_{2,3}$), 47.79 (C$_{5,6}$), 45.13 (C$_{1,4}$), 42.75 (C$_7$), 38.35 (C$_8$), 27.26 (C$_9$), 24.30 (C$_{10}$). Mass spectrum—(see Appendix 2.39), (EI$^+$): 394 (C$_{23}$H$_{26}$N$_4$O$_2$, M$^+$), 329 (MH$^+$-C$_5$H$_6$), 263 (MH$^+$-C$_{10}$H$_{12}$), 66 (M$^+$-C$_{18}$H$_{20}$N$_4$O$_2$). IR—(see Appendix 2.40), (KBr disc, cm$^{-1}$): 3050 (olefinic C—H stretching), 2999–2847 (saturated C—H stretching), 1858, 1777 (Asymmetric and symmetric C=O stretching, respectively), 1420 (C—N stretching).

Assignment of H atoms in compound exo-C5D

Assignment of C atoms in compound exo-C5D

Synthesis and Characterisation of exo,exo-N,N'-Hexylene-di-(norbornene-5,6-dicarboxyimides): (exo-C6D)

The same procedure as for the synthesis of exo-C3D was used to synthesise exo-C6D, but the starting material in this case was 1,6-diaminohexane (7.0 g, 0.06 mol) to yield exo-C6D as a white powder (45.3 g, 0.11 mol, 92% yield).

Mpt: 154° C.; Elemental analysis—Found C, 70.13%, H, 6.84%, N, 6.84%; calculated for $C_{24}H_{28}N_2O_4$: C, 70.57%, H, 6.91%, N, 6.86%. $^1$H nmr—(see Appendix 2.41), (CDCl$_3$, 400 MHz, δ (ppm)): 6.27 (t, 4H, H$_{2,3}$), 3.43 (t, 4H, H$_8$), 3.26 (p, 4H, H$_{1,4}$), 2.66 (d, 4H, H$_{5,6}$), 1.52 (m, 6H, H$_9$ and H$_7$), 1.31 (m, 4H, H$_{10}$), 1.20 (m, 2H, H$_7$). $^{13}$C nmr—(see Appendix 2.42), (CDCl$_3$, 100 MHz, δ (ppm)): 177.94 (C$_{11,12}$), 137.67 (C$_{2,3}$), 47.66 (C$_{5,6}$), 45.01 (C$_{1,4}$), 42.62 (C$_7$), 38.40 (C$_8$), 27.45 (C$_9$), 26.33 (C$_{10}$). Mass spectrum—(see Apendix 2.43), (EI$^+$): 408 (C$_{24}$H$_{28}$N$_4$O$_2$, M$^+$), 343 (MH$^+$-C$_5$H$_6$), 277 (MH$^+$-C$_{10}$H$_{12}$), 66 (M$^+$-C$_{19}$H$_{22}$N$_4$O$_2$). IR—(see Appendix 2.44), (KBr disc, cm$^{-1}$): 3050 (olefinic C—H stretching), 2999–2889 (saturated C—H stretching), 1860, 1777 (Asymmetric and symmetric C=O stretching, respectively), 1420 (C—N stretching).

Assignment of C atoms in compound exo-C6D

Assignment of C atoms in compound exo-C6D

Synthesis and Characterisation of exo,exo-N,N'-Nonylene-di-(norbornene-5,6-dicarboxyimides): (exo-C9D)

The same procedure as for the synthesis of exo-C3D was used to synthesise exo-C9D, but the starting material in this case was 1,9-diaminononane (9.5 g, 0.06 mol) to yield exo-C9D as a white powder (44.7 g, 0.10 mol, 83% yield).

Mpt: 68° C.; Elemental analysis—Found C, 71.82%, H, 7.99%, N, 6.23%; calculated for $C_{27}H_{34}N_2O_4$: C, 71.97%, H, 7.61%, N, 6.22%. $^1$H nmr—(see Appendix 2.45), (CDCl$_3$, 400 MHz, δ (ppm)): 6.28 (t, 4H, H$_{2,3}$), 3.43 (t, 4H, H$_8$), 3.26 (p, 4H, H$_{1,4}$), 2.66 (d, 4H, H$_{5,6}$), 1.52 (m, 6H, H$_9$ and H$_7$), 1.25 (m, 12H, H$_{10-12}$ and H$_7$). $^{13}$C nmr—(see Appendix 2.46), (CDCl$_3$, 100 MHz, δ (ppm)): 178.07 (C$_{13, 14}$), 137.78 (C$_{2,3}$), 47.75 (C$_{5,6}$), 45.11 (C$_{1,4}$), 42.68 (C$_7$), 38.67 (C$_8$), 29.19 (C$_9$), 27.00 (C$_{10}$), 27.69 (C$_{11}$), 26.84 (C$_{12}$). Mass spectrum—(see Appendix 2.47), (EI$^+$): 450 (C$_{27}$H$_{34}$N$_4$O$_2$, M$^+$), 385 (MH$^+$-C$_5$H$_6$), 319 (MH$^+$-C$_{10}$H$_{12}$), 66 (M$^+$-C$_{22}$H$_{28}$N$_4$O$_2$).

IR—(see Appendix 2.48), (KBr disc, cm$^{-1}$): 3050 (olefinic C—H stretching), 2997 . 2880 (saturated C—H stretching), 1860, 1779 (Asymmetric and symmetric C=O stretching, respectively), 1427 (C—N stretching).

Assignment of H atoms in compound exo-C9D

Assignment of C atoms in compound exo-C9D

Synthesis and Characterisation of exo,exo-N,N'-Dodecylene-di-(norbornene-5,6-dicarboxyimides): (exo-C12D)

The same procedure as for the synthesis of exo-C3D was used to synthesise exo-C12D, but the starting material in this case was 1,12-diaminododecane (12.0 g, 0.06 mol) to yield exo-C12D as a white powder (47.1 g, 0.10 mol, 80% yield).

Mpt: 64° C.; Elemental analysis—Found C, 73.29%, H, 8.51%, N, 5.79%; calculated for $C_{30}H_{40}N_2O_4$: C, 73.14%, H, 8.18%, N, 5.69%. $^1H$ nmr—(see Appendix 2.49), ($CDCl_3$, 400 MHz, δ (ppm)): 6.28 (t, 4H, $H_{2,3}$), 3.46 (t, 4H, $H_8$), 3.27 (p, 4H, $H_{1,4}$), 2.66 (d, 4H, $H_{5,6}$), 1.44 (m, 6H, $H_9$ and $H_7$), 1.24 (m, 18H, $H_{10-13}$ and $H_7$). $^{13}C$ nmr—(see Appendix 2.50), ($CDCl_3$, 100 MHz, δ (ppm)): 178.35 ($C_{14, 15}$), 138.06 ($C_{2,3}$), 48.02 ($C_{5,6}$), 45.39 $C_{1,4}$), 42.94 ($C_7$), 38.99 ($C_8$), 29.70 ($C_9$), 29.66 ($C_{10}$), 29.37 ($C_{11}$), 28.01 ($C_{12}$), 27.19 ($C_{13}$). Mass spectrum—(see Appendix 2.51), ($EI^+$): 492 ($C_{30}H_{40}N_4O_2$, $M^+$), 427 ($MH^+-C_5H_6$), 361 ($MH^+-C_{10}H_{12}$), 66 ($M^+-C_{25}H_{34}N_4O_2$). IR—(see Appendix 2.52), (KBr disc, $cm^{-1}$): 3045 (olefinic C—H stretching), 2997–2879 (saturated C—H stretching), 1860, 1779 (Asymmetric and symmetric C=O stretching, respectively), 1424 (C—N stretching).

Assignment of H atoms in compound exo-C12D

Assignment of C atoms in compound exo-C12D

Figure 8:
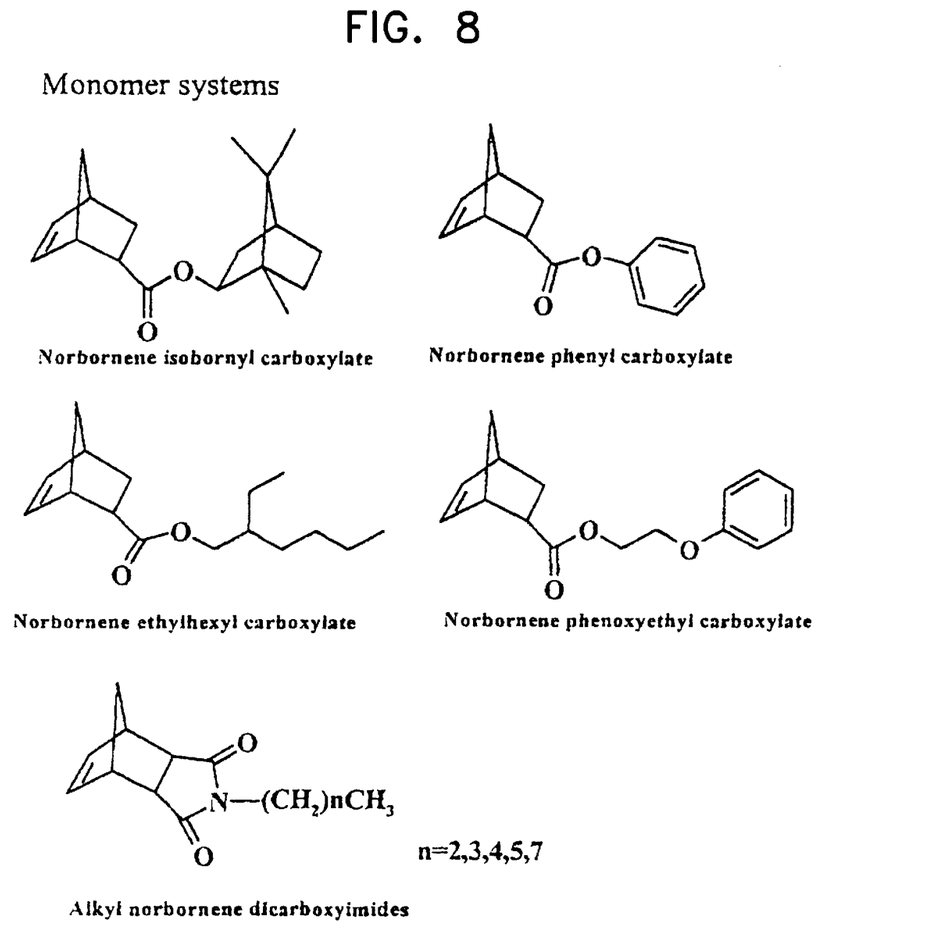

Other monomers are shown in FIGS. 8 and 9.

EXAMPLE 6

Polymerisation of Monofunctional Monomer
Polymer of N-Hexylnorbornene-5,6-dicarboxyimide exo-C6M;

The monomer (20 g, 0.08 mol) and ruthenium carbene initiator (17 mg, 2.1×10–5 mol, ratio [monomer]:[initiator] 3,900:1) were mixed in a small reaction vessel and stirred at room temperature for 15 minutes. After 15 minutes, the reacting mixture was introduced into a glass mould using a syringe. The filled mould was placed in an oven at 60C for 20 minutes and 160C for 60 minutes. The mould then was removed from the oven and the final product was removed and allowed to cool to room temperature. The product is a glassy polymer, the extent of polymerisation is 98% (ie 2% residual monomer).

EXAMPLE 7

Polymerisation of Monofunctional Monomer

Figure 10:
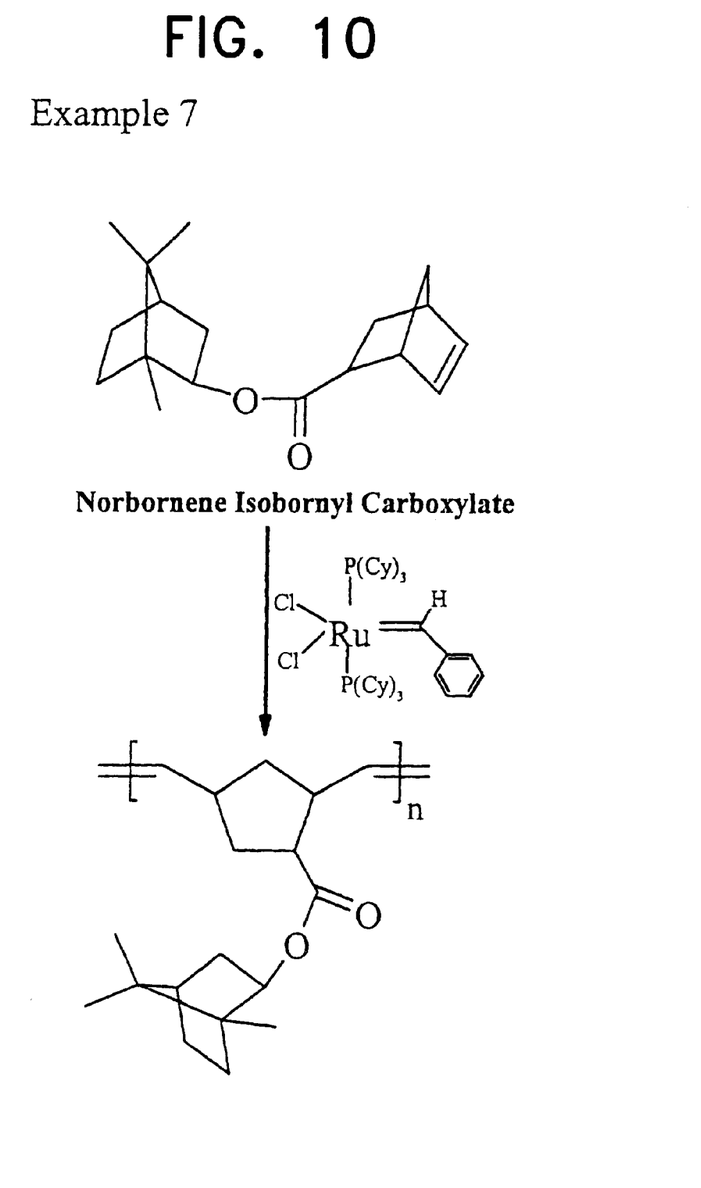

Using the same procedure as Example 6 the polymer of norbornene isobornyl carboxylate was obtained as illustrated in FIG. 10.

EXAMPLE 8

Copolymerisation of Monofunctional and Difunctional Monomers

Using the same procedure as Example 6 with a mixture of neat monomers exo-CnM; n=2,3,4,5,7 and difunctional monomer exo-CnD; n=3,5,6,9,12 of Example 4 and FIG. 7 above, and initiator, thermoset polymer was obtained.

EXAMPLE A1

Testing of Copolymer Samples C5M M/I 8.000 and C12D

Samples obtained from Example 8 were subject to tests to measure Tg and modulus as a function of incomplete/ complete cure, homogeneity of cure, crosslinker and absolute values as a function of amount of crosslinker present.

Figure 11:
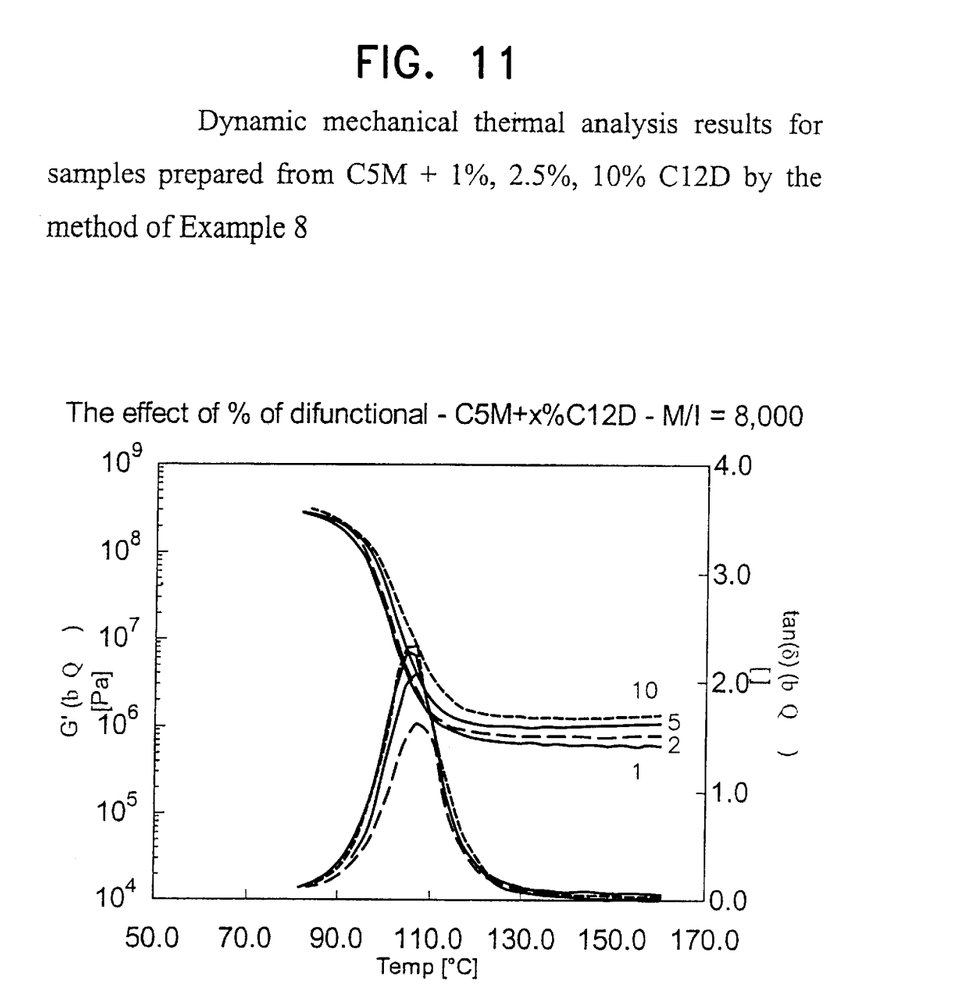

The results are shown in FIG. 11 for samples prepared from C5M +1%, 2.5%, 10% C12D.

FIG. 11 illustrates:
a) sharp Tg transition, indicating there is no inhomogeneous cure at temperature above or below Tg;
b) very flat plateau modulus above Tg;
c) plateau modulus increases with increasing percentage of cross-linker;
d) Tg shifts up with increasing percentage of crosslinker: height of transition decreases with increasing % of crosslinker, indicating genuine and complete crosslinking is present.

Further advantages of the invention are apparent from the foregoing.

What is claimed is:

1. A process for the catalytic copolymerisation of strained activated cyclic olefins consisting of contacting 99–50 parts of an activated strained mono (poly)cyclic olefin monofunctional monomer of formula with 1–50 parts of a strained di(poly)cyclic olefin difunctional monomer of formula in the presence of a catalyst or an initiating agent, wherein the amount of mono and difunctional monomers totals 100 parts of monomer
wherein the group represents a strained (poly)cyclic olefin, whereby the monomers form a copolymer comprising the repeating unit and 1–50 parts of the unit which is adapted for subsequent cross linking of respective copolymer chains in the presence of heat and catalyst to form an amount of a cross linked copolymer comprising the unit, wherein the monofunctional and difunctional monomer are of formulae I and II:

wherein at least one $R^1$ is a group Y facilitating non-DCP ROMP reaction with monomer II, and X comprises a 2, 3 or 4-valent or two 2-valent optionally substituted hydrocarbon spacer group(s) adapted to bridge adjacent crosslinked chains and which provides for controllable uniformity and degree of cross linking, providing controlled modulus and Tg wherein at least one $R^1$ is independently selected from $COOR^2$, $CONR^2$ and $COR^2$;

in which $R^2$ is selected from straight chain and branched, saturated and unsaturated $C_{1-12}$ hydrocarbon optionally substituted by one or more hydroxy, halo, aryl, cyclo $C_{1-8}$ alkyl, bisphenol, phenol, hydroquinone, and optionally including at least one heteroatom;

and one or more of the remaining groups $R^1$ is selected from H, $C_{1-3}$ alkyl and halo; or two groups $R^1$ together form a cyclic amide or anhydride —$(CH_2)_p$ $CONR^3CO$—; —$(CH_2)_p$ $COOCO$— in which p is 0–4, and is 0 when the two groups form a fused structure or 1–4 when the two groups form a spiro structure;

$R^3$ is as hereinbefore defined for $R^2$ and is a bridging unit; and wherein

X is a linear bridging group —$COOR^2COO$— wherein $R^2$ is as hereinbefore defined, substituting the cyclic olefin at the 5 positions and the 6 positions are unsubstituted or substituted by a substituent selected from H, $C_{1-3}$ alkyl and halo; or X is a fused bridging group —$(CO)_2NR^3N(CO)_2$— in which —$(CO)_2$ N forms a 5 membered cyclic ring with the 5 and/or 6 positions of each cyclic olefin, or a methylene group and wherein R³ is as hereinbefore defined.

2. The process as claimed in claim 1 wherein the monofunctional monomers, the difunctional monomers, or both are exo-.

3. The process as claimed in claim 1 which comprises dissolving the difunctional monomer in the monofunctional monomer in the absence of an added solvent and adding initiator to the mixture of neat monomers in the absence of the added solvent.

4. The process as claimed in claim 1 wherein ratio of the monofunctional monomer to the difunctional monomer I:II is in the range 99:1 to 50:50.

5. The process as claimed in claim 1 wherein catalyst comprises the reaction product of a metal oxide or halide and an alkylating agent.

6. The process as claimed in claim 1 wherein the catalyst comprises well defined ruthenium carbene initiator.

7. The process as claimed in claim 1 which is carried out at elevated temperature in excess of room temperature up to 200° C. depending on preferred Tg, to give homogeneous cure.

8. The process as claimed in claim 1 for the preparation of elastomers, plastics, composites in any desired form as shaped products, films, coatings and the like.

9. The process as claimed in claim 1 including additionally selecting the mono and difunctional monomer for polymerisation, comprising determining modulus and chemical properties of desired cross-links, selecting a ratio of mono:di functional monomers determining the degree of cross-linking, for the cross-linking copolymerisation reaction thereof to provide product with desired properties.

10. The process as claimed in claim 12 including additionally selecting the mono and difunctional monomer for polymerisation, comprising determining modulus and chemical properties of desired cross-links, selecting a ratio of mono:di functional monomers determining the degree of cross-linking, for the cross-linking copolymerisation reaction thereof to provide product with desired properties.

11. A method for the preparation of shaped products which comprises conducting the process of claim 1 for reaction injection molding (RIM) or resin transfer molding (RTM), by combining separate streams of the polymerisable monofunctional monomers and/or difunctional bridged monomers and catalyst (RIM) or premixing (RTM), injecting into a suitable mold and simultaneously or subsequently heating to activate and/or complete the polymerisation reaction.

12. A thermoset or thermoplast polymeric product or a shaped product obtained by the process of claim 1.

* * * * *